March 4, 1969     E. HOPPE     3,431,518
ELECTROMAGNETICAL PROTECTIVE RELAY FOR THREE-PHASE RECEIVERS
Filed Feb. 2, 1967

Egon Hoppe
INVENTOR.

BY

Karl G. Ross
Attorney

United States Patent Office 3,431,518
Patented Mar. 4, 1969

3,431,518
ELECTROMAGNETICAL PROTECTIVE RELAY FOR THREE-PHASE RECEIVERS
Egon Hoppe, 2 Str. Stirbei Voda, Bucharest, Rumania
Filed Feb. 2, 1967, Ser. No. 613,653
Claims priority, application Rumania, Feb. 3, 1966, 50,912
U.S. Cl. 335—102
Int. Cl. H01h 51/00, 51/30
4 Claims

ABSTRACT OF THE DISCLOSURE

An electromagnetic relay for three-phase systems having three electromagnetic coils connected in series with the respective sides of a three-phase line and the respective sides of a three-phase load, each of the coils surrounding a respective tube containing a viscous fluid and co-operating with a magnetically permeable cone shiftable in the respective tube against the viscous drag of the fluid. The tubes lies in a common vertical plane and terminate at a movable armature carrying one contact of a pair of spring-biased switch contacts operable to de-energize the load or operate a warning system.

---

The invention concerns a relay which insures multilateral protection for three-phase electric motors or for other three-phase loads (e.g. for control devices with magnetic amplifiers), against the danger of the suppression or failure of a phase, against short-circuits between two phases, against a grounding of a phase, against three-phase short-circuits, against technological symmetrical overloads, against rheostatic short-circuits caused by insulation defects.

The known protection devices which offer a multilateral protection are not an optimum solution for all the protection problems which may arise. Indeed for some of the known means of protection their acting time is in some cases too long while in other cases it is too short. For instance the usual thermic relays don't release with sufficient celerity during starting with an interrupted phase, as in this case the differentially energized bimetallic element reduces insufficiently the release time. On the other side electromagnetic devices which release in the case of a pronounced assymmetry, act sometimes with excessive speed, so that e.g. during the starting period, when the contactor fingers don't close simultaneously during the switching from star to delta configuration, unnecessary release may result.

The invention concerns a three-phase electromagnetical relay, with three current-coils, in which relay the electromagnetic force necessary for the operation of the armature, arises only at the moment when the iron cores of the coils have executed a certain movement (of a great or short distance, slowly or rapidly), which movement depends on the existing conditions, of the initial state and of the respective delay caused by the flowing-speed of a liquid, existing in a hermetical closed vessel, containing the cores.

The above and other objects, features and advantages of the present invention will become more readily apparent from the following description, reference being made to the accompanying drawing in which.

Figure 1B:
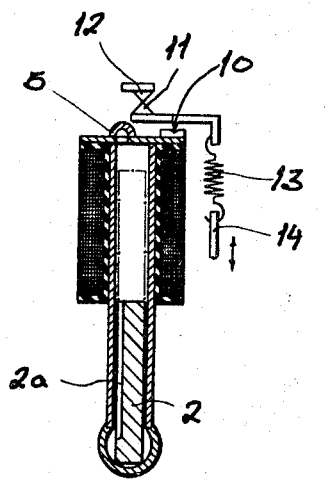
FIG. 1B is a cross-sectional view taken along the line IB—IB of FIG. 1A.
Figure 1A:
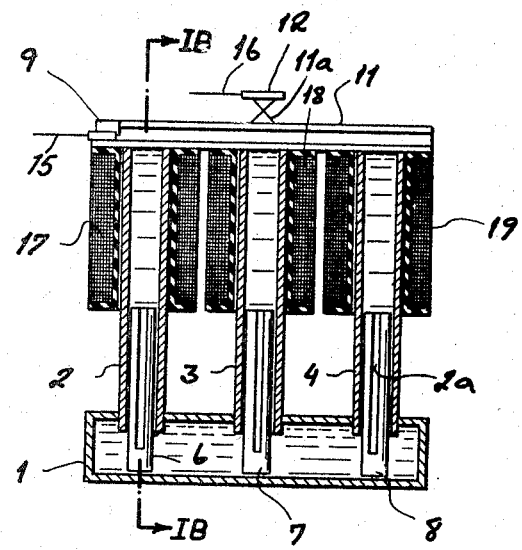
FIG. 1A is a vertical cross-sectional view through a relay according to the present invention.

A hermetically closed vessel, formed by a lower receptacle 1, by cylindrical, vertical tubes, 2, 3 and 4 and by an upper trough 5, filled with a liquid of an adequate viscosity, encloses three iron cores of an adequate weight. The cores are of such a shape, that during their movement from one end to the other, the liquid may flow through the clearances between the cores 6, 7, 8 and the cylindrical tubes 2, 3, 4 thus causing a delay of some minutes. In the cores there is a longitudinal slit 2a of a certain length and of a section thus calculated, that the flowing of the liquid may cause a delay of some seconds.

Above the vessel there oscillates, in two knife-edge bearings 9 and 10 a movable armature 11, provided with a contact 11a, which, by the traction of the spring 13, controllable by the control-piece 14, rests on the stable contact 12. The two conductors 15 and 16, electrically linked to the stable contact 12 and to a bearing 9 connect the contact in the releasing circuit of the automatic switch. On each vertical tube is mounted a current-energized coil 17, 18 and 19, through which passes the current of the respective phases. The relay may be completed by a blocking device (in the released position) and by a manual recharging device and also by a signalling device linked to the mobile contact.

Figure 2:
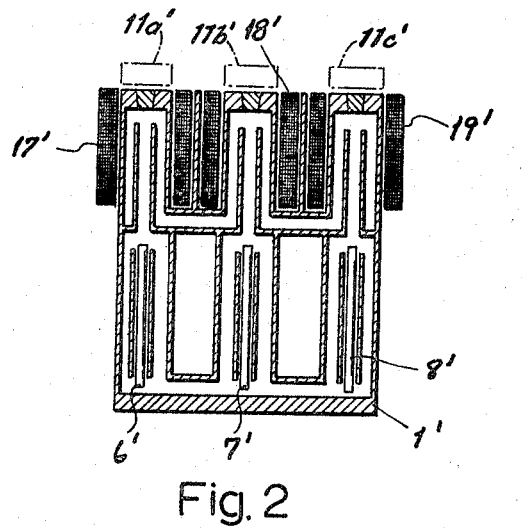
FIG. 2 is a cross-sectional view similar to FIG. 1A but illustrating another embodiment of the invention.

The vessel of the relay may be made by casing, in the one-piece construction shown in FIG. 2, such that the coils 17', 18' and 19' may be mounted on the prefabricated vessel 1', which may be previously, separately, filled. (The armature may be subdivided as shown at 11a', 11b' and 11c' into separate members individually acted upon by the cores.)

In a symmetrical regime with a current I inferior to the nominal current $I_n$ (or with a current 1, 3 $I_n$ corresponding to an overload in a prolongated regime) the cores 6, 7, 8 or 6', 7', 8' rest at the base of the vessel, as the electromagnetic forces acting on the coils can't overcome the weights of the cores.

For a current greater than that of the duration load the cores are attracted with a speed, depending on the value of the current and on the delay caused by the flowing of the liquid in the other sense.

For a current greater than that corresponding to the duration load the core ascends, at first with a greater speed, and later on, after the covering of the slit, with a lesser speed, depending on the flowing of liquid through the clearance existing between the core and the tube.

If the overload is of a high value but of a short duration (e.g. during the starting) the core doesn't reach a position, enabling it to attract the mobile armature 11, because after the diminishing of the current to its nominal value the electromagnetic forces of the series-connected core diminishes and the core returns slowly to its normal position. If the overload is of reduced value, but of a long duration the core arrives after a long delay in the releasing position and the mobile armature 11 can be attracted.

If one phase is interrupted during the working time or during the starting, the attraction force for the respective core exists no more, while for the other two cores the attraction force grows corresponding to the growing of the currents of the respective phases. The cores of the faultless phases ascend thus rapidly pushing the liquid above the respective cores through the tube of the third core, which descends or rests in the lower position.

In the case of the short-circuits between two phases or of short-circuits between a phase and the body (the neutral point being earthed), the cores or the core influenced by the short-circuit current realize the releasing in the same manner as in the case of the interruption of a phase during the working-time. The relay according to the invention presents the following advantages:

(1) The acting time, having always the right value, not too long nor too short, prevents the deterioration of the receiver and gives the possibility to apply the relay to receivers of all kinds, without non-necessary releasings.

(2) The possibility of modifying the degree of inertia (for very difficult or very frequent startings) by constructional elements (the length and the section of the slit and the clearance between core and tube), independently of the acting time, in the case of faults.

(3) The protection of contactors, of insufficient breaking power for currents of very high intensities.

(4) Elimination of bi-metallic elements.

(5) Single and simple control.

(6) Simple and robust construction, the hermetical closed vessel avoiding the possibility of the soiling or the alteration of the liquid.

(7) Reduced overall size.

(8) Reduced cost-price.

What is claimed is:

1. A protective relay responsive to unbalancing of a three-phase electrical network and connectable between a three-phase source and a three-phase load, comprising:

three electromagnetic coils having generally upright axes in a common plane and respectively connected in circuit with phases of said load and said source for developing respective magnetic fields responsive to the current flow through the respective coils;

three generally upright tubes extending through said coils respectively, and a duct connecting the lower ends of said tubes, said tubes and duct being coplanar and containing a viscous fluid;

respective magnetically permeable cores axially shiftable in the respective tubes against the resistance of said fluid upon energization of said coils in an interdependence determined by the viscosity of said fluid; and electrical contact means, including a movable armature extending along the upper ends of said three tubes and responsive to the movement of said cores in said tubes toward and away from said armature for operating said contact means.

2. A protective relay as defined in claim 1, further comprising means forming a liquid passage along said cores of a cross-section dimensioned to determine the response time of the respective core, and means forming a fluid passage interconnecting the upper ends of said tubes to permit fluid displaced by said cores to pass from one of said tubes to the others.

3. The protective relay defined in claim 2 wherein said armature is subdivided into three sections each responsive to the movement of a respective core in a respective tube.

4. A protective relay as defined in claim 2, further comprising spring means acting upon said movable armature and of a strength sufficient to retain said armature against movement in response to the movement of said cores until said cores attain predetermined positions corresponding to predetermined values of the current through the respective coils.

References Cited

UNITED STATES PATENTS

| | | | |
|---|---|---|---|
| 1,868,256 | 7/1932 | Rippl | 335—62 |
| 3,043,933 | 7/1962 | Weinfurt | 335—62 |

BERNARD A. GILHEANY, *Primary Examiner.*

HAROLD BROOME, *Assistant Examiner.*